(12) United States Patent
Lacaze et al.

(10) Patent No.: US 10,151,583 B2
(45) Date of Patent: Dec. 11, 2018

(54) METHOD OF MEASURING A 3D PROFILE OF AN ARTICLE

(71) Applicant: SOLYSTIC, Bagneux (FR)

(72) Inventors: Vincent Lacaze, Paris (FR); Rajna Jacob, Paris (FR); Hicham El Bernoussi, Paris (FR)

(73) Assignee: SOLYSTIC, Bagneux (FR)

( * ) Notice: Subject to any disclaimer, the term of this patent is extended or adjusted under 35 U.S.C. 154(b) by 13 days.

(21) Appl. No.: 15/428,617

(22) Filed: Feb. 9, 2017

(65) Prior Publication Data

US 2017/0160080 A1 Jun. 8, 2017

Related U.S. Application Data

(63) Continuation of application No. PCT/FR2016/052340, filed on Sep. 15, 2016.

(30) Foreign Application Priority Data

Sep. 22, 2015 (FR) ...................................... 15 58928

(51) Int. Cl.
*G01B 11/25* (2006.01)
*G01B 11/00* (2006.01)
(Continued)

(52) U.S. Cl.
CPC ............ *G01B 11/2522* (2013.01); *B07C 1/04* (2013.01); *B07C 1/10* (2013.01); *G01B 11/00* (2013.01); *B07C 5/00* (2013.01)

(58) Field of Classification Search
CPC .. B07C 5/00; B07C 5/04; B07C 5/065; B07C 5/10; B07C 5/342; B07C 5/3422;
(Continued)

(56) References Cited

U.S. PATENT DOCUMENTS

| 4,837,732 A | 6/1989 | Brandestini |
| 2005/0231734 A1 | 10/2005 | Johannesson et al. |

(Continued)

FOREIGN PATENT DOCUMENTS

| DE | 19721688 A1 | 9/1998 |
| FR | 2929481 A1 | 10/2009 |

OTHER PUBLICATIONS

International Search Report in corresponding International Patent Application No. PCT/FR2016/052340, dated Jan. 18, 2017.
(Continued)

*Primary Examiner* — Joseph C Rodriguez
*Assistant Examiner* — Kalyanavenkateshware Kumar
(74) *Attorney, Agent, or Firm* — Edell, Shapiro & Finnan, LLC

(57) ABSTRACT

The invention relates to a method of measuring a 3D profile of an article moving on a conveyor in a certain conveying direction, which method includes a step consisting in using an optical sensor to scan, by triangulation, a laser line projected onto the article moving on the conveyor. The method further includes a step of using the optical sensor to scan, by contrast difference, the article moving on the conveyor, and a step of making combined use of the results of the scans by triangulation and of the scans by contrast difference in a data processor unit for the purpose of measuring the 3D profile of the article.

6 Claims, 2 Drawing Sheets

(51) Int. Cl.
*B07C 1/10* (2006.01)
*B07C 1/04* (2006.01)
*B07C 5/00* (2006.01)

(58) Field of Classification Search
CPC ... B07C 1/04; G01B 11/2518; G01B 11/2522; G01B 11/303; G06K 7/10722; G06K 7/70742; G01N 21/8901; G01N 21/8903
USPC ............... 209/539, 552, 576, 577, 579, 900
See application file for complete search history.

(56) References Cited

U.S. PATENT DOCUMENTS

| | | | | |
|---|---|---|---|---|
| 2015/0001138 A1* | 1/2015 | Brunsen | ............... | B07C 5/3412 |
| | | | | 209/577 |
| 2015/0209831 A1* | 7/2015 | Wargo | ...................... | B07C 1/02 |
| | | | | 209/539 |

OTHER PUBLICATIONS

French Search Report in corresponding French Patent Application No. 1558928, dated Jun. 8, 2016.
Translation of International Preliminary Report on Patentability for corresponding International Patent Application No. PCT/FR2016/052340 transmitted on Apr. 5, 2018.

* cited by examiner

METHOD OF MEASURING A 3D PROFILE OF AN ARTICLE

CROSS-REFERENCE TO RELATED APPLICATIONS

This application is a continuation of International Application No. PCT/FR2016/052340, filed on Sep. 15, 2016, which claims priority under 35 U.S.C. § 119 to Application No. FR 1558928, filed on Sep. 22, 2015, the contents of which are incorporated by reference herein in their entirety.

TECHNICAL FIELD

The invention relates to the field of measuring three-dimensional (3D) profiles of articles. The invention relates more particularly to a method of measuring a 3D profile of an article moving on a conveyor in a certain conveying direction, which method includes a step consisting in using an optical sensor to scan, by triangulation, a laser line projected onto said article moving on said conveyor.

BACKGROUND ART

Measuring 3D profiles of articles is commonly used in the field of postal sorting for the purpose of obtaining information on size, height, and orientation of parcels being conveyed flat on a conveyor.

That is why certain postal sorting machines are equipped both with a sensor installed along the conveyor and capable of taking scans of the articles that are moving along it, and also with a data processor unit suitable for retrieving the scans from the sensor so as to reconstruct a 3D profile of the moving article. Presently, several techniques are commonly used in postal sorting, each having its own specific features.

For example, stereoscopy makes it possible to reconstruct the relief of an article on a conveyor on the basis of two images showing the article flat on the conveyor taken from two distinct angles. An analysis of the difference in the positions of characteristic points between the two images makes it possible to compute a position in depth for each of said points relative to a fixed point, and thus to determine the 3D profile of the article.

However, that technique suffers from the risk that the article to be measured might have few characteristic points, in particular when zones are present that are uniform between the article and conveyor, leading to poor matching between the points on the two images and thus to an erroneous measurement.

Laser triangulation is also widely used because it makes it possible to achieve very good accuracy for the height measurement with measurement distances as great as several meters, thereby making it possible to cover the spectrum required for postal sorting. Laser triangulation operates with a camera that measures the deformation of a laser line projected at a known angle onto the surface to be measured. French Patent Document FR 2 929 481 discloses a method of performing visiometric inspection on baked products that uses laser triangulation.

However, the measurement is limited in the conveying direction in which the article is conveyed, and that limitation generates blind spot zones that are detrimental when the articles have complex shapes or when articles are superposed on one another.

Other techniques are also used in fields other than postal sorting, such as "Time Of Flight" (TOF) that consists in illuminating the conveyor and the articles with a flash of light and in computing the time it takes for the flash to travel from the article to the optical sensor. The time of flight of that flash is directly proportional to the distance between the optical sensor and the measured article. The time of flight is measured independently by each pixel of the optical sensor, thereby making it possible to obtain a full 3D image of the measured article.

However, the long integration times of TOF cameras are inappropriate for making it possible to obtain total acquisition of an article moving on a conveyor. In addition, that technology does not propose sufficient resolution for the measurement accuracy desired for postal sorting.

Unfortunately, in postal sorting, it is very frequent for parcels to be conveyed loosely (superposed, juxtaposed, tipped on edge, etc.). None of the above-presented techniques make it possible to measure the 3D profiles of such moving parcels correctly.

SUMMARY OF THE INVENTION

An object of the invention is to remedy the above-indicated drawbacks.

The invention therefore provides a method of measuring a 3D profile of an article moving on a conveyor in a certain conveying direction, which method includes a step consisting in using an optical sensor to scan, by triangulation, a laser line projected onto the article in the field of view of said sensor transversely to said direction, a step consisting in taking a contrast image of the top of said article moving on said conveyor, and a step consisting in making combined use of the results of the scans by triangulation and the contrast image in a data processor unit for the purpose of measuring the 3D profile of said article, said method being characterized in that the contrast image is formed using the same optical sensor as the optical sensor that performs the scans by triangulation, said optical sensor being arranged to scan, in its field of view, and in contrast difference, a strip that is transverse to said conveying direction, and in that said data processor unit is arranged to match, in time, the scans by triangulation and the scans by contrast difference in such a manner as to merge them for measuring said 3D profile.

The method of the invention may advantageously also have the following features:
- the steps consisting in scanning the article by laser triangulation and by contrast difference are performed in alternation;
- the steps consisting in scanning the article by laser triangulation and by contrast difference are performed simultaneously;
- a step consists in using said optical sensor to scan by triangulation another laser line projected onto said article that is moving;
- a step also consists in illuminating the article with white light, e.g. using white light-emitting diodes (LEDs) parallel to the laser line in order to perform the scan of said article by contrast difference;
- it makes it possible to detect multiple loading of articles on said conveyor.

The basic idea of the invention is thus to perform the 3D measurement of an article while it is moving, and more particularly when it is superposed or juxtaposed relative to another article, by using the complementary nature of two scans of the article that are obtained by an acquisition by laser triangulation and by an acquisition by contrast difference. This improvement makes it possible to measure a high-resolution 3D profile of the article without increasing the frequency of acquisition of the images. This type of method also makes it possible to measure 3D profiles of articles of complex shapes.

The idea of the invention also consists in using a single optical sensor in order to simplify the general operation of the method without adding any new equipment. It can thus be understood that the laser scans and the contrast-difference scans are performed in the field of view of the same sensor, making it possible to simplify combined use of them for measuring the 3D profile.

The method of the invention may also advantageously be implemented in apparatus for sorting articles conveyed on a conveyor in a certain conveying direction, and more particularly in the field of postal sorting. The 3D profile of each postal article conveyed is also considered as sorting information and is used in a manner complementary with the other sorting information (address, etc.) for determining the corresponding sorting outlet.

The method is also, in particular, well suited for detecting situations (multiple loading) in which articles are overlapping on the conveyor of postal sorting equipment.

BRIEF DESCRIPTION OF THE DRAWINGS

The present invention can be better understood and other advantages appear on reading the following description and on examining the accompanying drawings, in which.

DESCRIPTION OF IMPLEMENTATIONS

Figure 4:
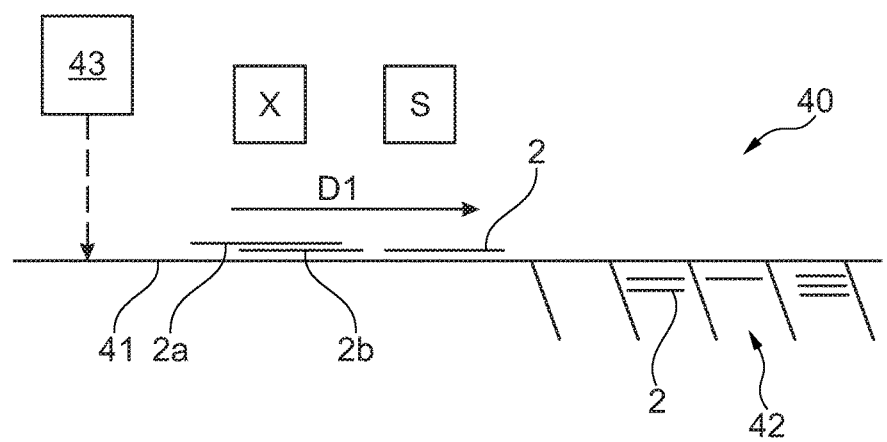
FIG. 4 is a highly diagrammatic view of postal article sorting apparatus suitable for implementing the method of the invention for measuring a 3D profile.

In this example, the method of the invention for measuring a 3D profile is implemented in postal article sorting apparatus 40 comprising a sorting conveyor 41 for conveying postal articles such as 2, 2a, 2b in series in a certain conveying direction D1 past sorting outlets 42 under the control of a monitoring and control unit 43, as shown in FIG. 4. In the example shown in FIG. 4, two mutually superposed articles 2a, 2b need to be identified by measuring their 3D profiles (block X) and need to be separated from each other (block S) so as to be sorted separately into the sorting outlets 42.

Figure 1:
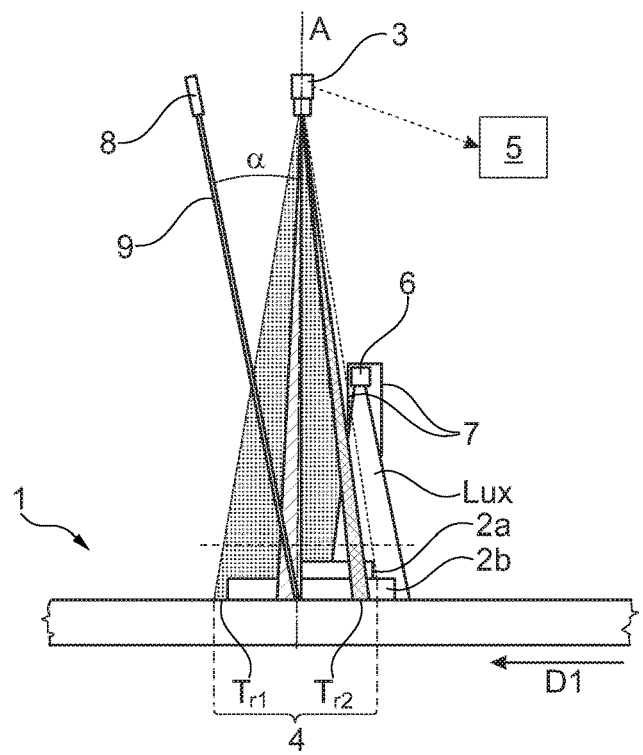
FIG. 1 is a diagrammatic view of a portion of an article conveyor seen in profile and suitable for implementing the method of the invention for measuring a 3D profile of an article.

FIG. 1 shows a conveyor 1 with a matrix optical sensor 3 suitable for scanning a portion 4 of the conveyor 1 that corresponds to the field of view of the sensor 3 and that extends over the entire width L of the conveyor 1. In this example, the optical axis A of the sensor 3 is preferably perpendicular to the conveyor 1 in such a manner as to facilitate observing the moving postal articles 2, 2a, 2b in plan view, typically from a height of one meter. In this example, the matrix optical sensor 3 is suitable for forming a digital image over a plurality of rows of pixels, and typically over about one hundred rows of pixels, it being possible for this digital image to include, at the same time, a laser line projected onto the moving article and a contrast-difference strip parallel to the laser line and transverse to the direction D1.

The optical sensor 3 makes it possible to offer digital images of sufficient resolution for dimensional measurements with accuracy to within about one millimeter over the widths and over the heights of the articles.

The scans by the optical sensor 3 are, inter alia, used to highlight the grayscale contrast differences in the conveyor portion 4. In known manner, a plurality of consecutive scans make it possible, after they have been concatenated by a data processor unit 5 of the conveyor 1, to define all of the outlines of the articles 2a, 2b that are moving in the conveyor portion 4. Contrast difference also makes it possible to determine the presence and the positioning of labels 12 and/or of folds or creases in the articles 2a, 2b. In order to increase the contrast on the portion 4 of the conveyor 1 and to make it more uniform, artificial lighting of the type comprising LEDs 6, which lighting is white in this example, is also mounted between the optical sensor 3 and the belt of the conveyor 1. The LEDs 6 are placed against a lightshade 7 making it possible to restrict the propagation of light LUX to a limited strip of the portion 4 of the conveyor 1 that extends over the width of the conveyor 1.

Without limiting the scope of the invention, the artificial lighting 6 may also operate in cross-polarized manner in order to reduce the reflections off the articles 2a, 2b, e.g. when they are wrapped in plastics film.

Figure 2:
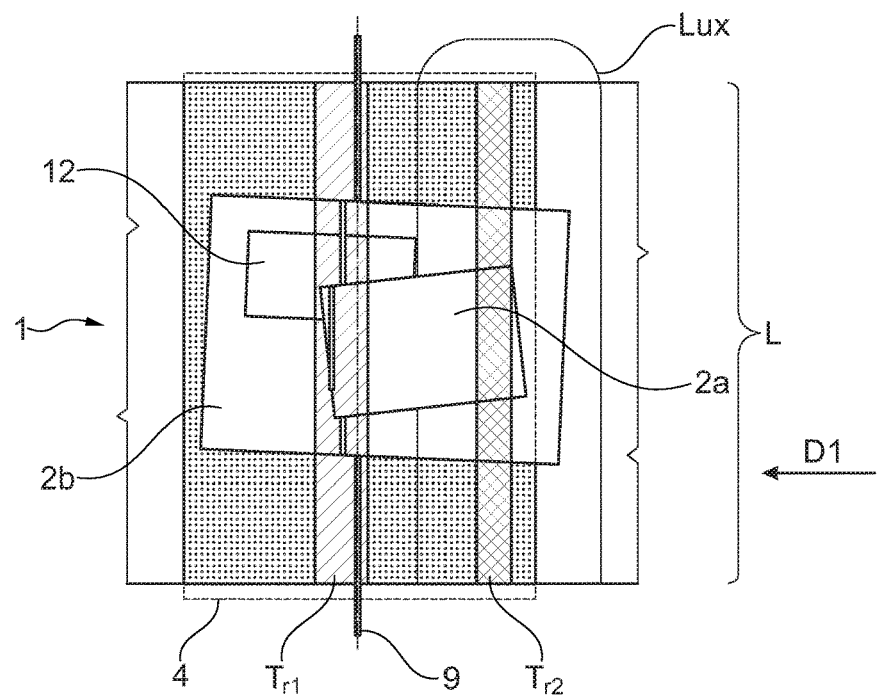
FIG. 2 is a diagrammatic view of said conveyor portion as seen from above.

The conveyor 1 also includes a first laser source 8 suitable for projecting a laser line 9 onto said conveyor portion 4. In this example, the laser line 9 is inclined at an angle α (lying in the range 10° to 30°, and preferably 20°) relative to the axis A of the optical sensor 3, and is directed transversely to the conveying direction D1 so as to extend over the entire width of the conveyor 1. It can thus be understood that the laser line 9 is deformed by the articles 2a, 2b as it crosses the conveyor portion 4. The laser line 9 in the absence of articles 2a, 2b in the conveyor portion 4 is shown in FIG. 2 as a dashed line, and the laser line as deformed by the articles 2a and 2b is shown as offset solid lines.

In known manner, the profile of the laser line 9 deformed by the articles 2a, 2b and sensed during the successive scans enables the data processor unit 5 to determine the heights of the articles 2a, 2b on the known principle of laser triangulation, or laser scanning.

Without limiting the scope of the invention, the conveyor 1 includes a second laser source (not shown) that is suitable for projecting another laser line in the conveyor portion 4, which other laser line is distinct from the laser line 9. It can be understood that this other laser line, which, in this example, is projected facing the laser line 9, makes it possible to consolidate the acquisition by laser triangulation by limiting the blind spots when the articles 2a, 2b are of complex shapes are when a plurality of articles 2 are mutually superposed, as shown in FIG. 1. In this situation, the contrast strip Tr2 may be interposed between the two laser lines projected onto the article moving on the conveyor 1. The width of the contrast strip and the spacing between the laser lines projected in the portion 4 is related to the speed of movement of the conveyor 1, which fixed speed of movement is a parameter that is predetermined so that the triangulation scans and the contrast-difference scans match in time so that they can be merged for measuring the 3D profile of the article. Typically, with a sensor of 100 rows of pixels, it is possible to have 20 rows of pixels reserved for scanning the contrast strip and the other rows of pixels reserved for triangulation scanning of the two laser lines while having a separation of about one hundred millimeters between the contrast strip and the laser line in the portion 4.

The processor unit 5 is also designed to merge all of the data of the laser scans and of the contrast difference scans.

Figure 3:
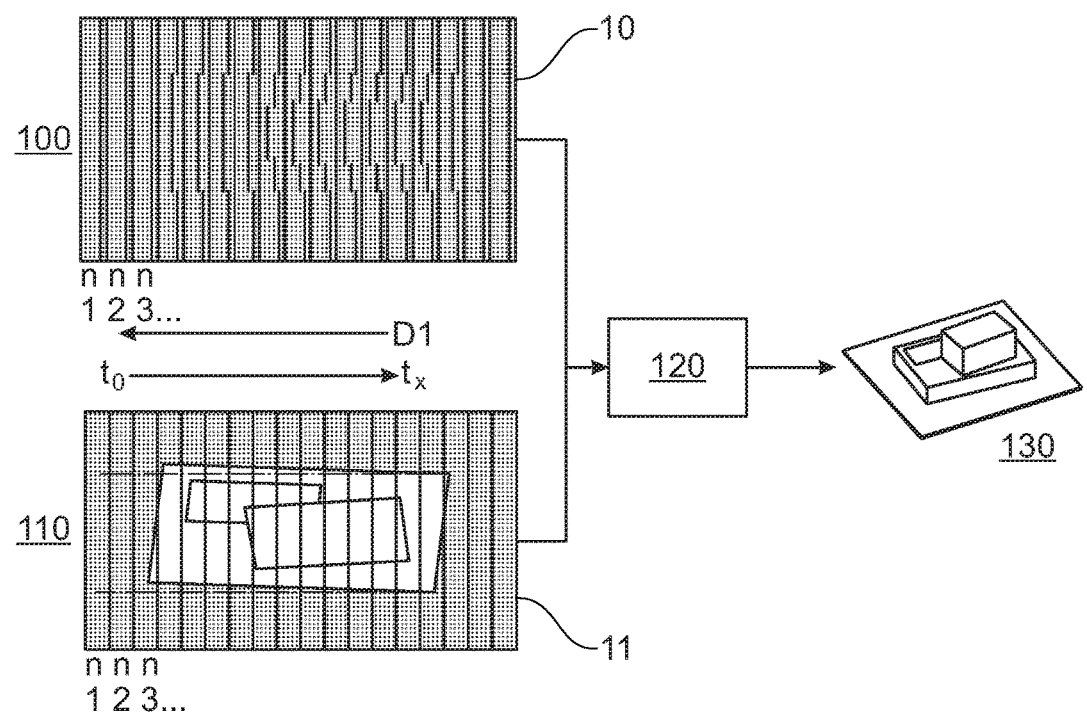
FIG. 3 is a diagrammatic view of the data processor unit merging a laser scan and a contrast-difference scan to obtain a 3D measurement of superposed articles in an implementation of the invention.

For this purpose, the unit 5 subdivides the scan including the profiles of the heights 10 and the scan including the profiles of the outlines 11 each into a plurality of columns of pixels of identical size in the conveying direction D1, as shown in FIG. 3.

Each column is assigned an order number (n1, n2, etc.) corresponding to a scan in the conveyor portion at a time T (t0 to tx) as the articles move. Matching or merging is performed on the columns having an identical order number by the processor unit 5. Once all of the columns have been merged, the measurement of the 3D profile of the article is determined by the data processor unit 5.

In this example, in order to prevent the laser lines from disturbing the contrast difference scan and vice versa, the optical sensor 3 is designed to scan the articles 2a, 2b in alternation by means of an encoder wheel (not shown). In this example, the encoder wheel makes it possible to scan the portion 4 in segments (Tr1 and Tr2) and at constant pitch. Each segment thus corresponds to a column of pixels of a scan. It can also be understood that the frequency of the scans is defined, inter alia, by the speed of movement of the conveyor 1. In view of the negligible distance between the two acquisition zones, which distance is, in this example, of the order of a few centimeters, the laser scans and the contrast difference scans are considered to have been done at the same time.

In another implementation of the invention, the laser and contrast scans may be performed simultaneously so that each digital image 4 formed by the optical sensor 3 includes both the profile of the laser line 9 and the contrast difference. In this situation, the data processor unit 11 is designed to detect the disturbances generated by the laser line 9 and to modify accordingly the measurement of the profile of the article 2 by contrast difference. It can be understood that, in this example, the lightshade 7 makes it possible to restrict the light LUX to a limited zone in the portion 4 of the conveyor 1. Thus, the laser and contrast-difference scans can be performed simultaneously without leading to large disturbances to the measurement of the 3D profile of the article 2 by contrast difference.

When two superposed or juxtaposed articles 2a, 2b are being conveyed on a conveyor, as shown in FIGS. 1 and 2, the method consists, in a first stage, in scanning 100 the articles 2a, 2b by laser triangulation in order to obtain a profile of the heights, as shown in FIG. 3. In a second stage, the method consists in scanning 110 the articles 2a, 2b by contrast difference in order to obtain the outlines of said articles. Then the method consists in using the data processor unit 5 to merge 120 the laser and contrast-difference scans in order to obtain the measurement 130 of the profiles 3D of the articles 2a, 2b.

In FIG. 4, the equipment represented by block X is specially designed to implement the method of the invention so as to measure the 3D profiles of postal articles such as 2a and 2b that are, in this example, mutually superposed, and so as to detect such superposition (multiple loading of articles on the conveyor 41) in such a manner that equipment represented by block S that is downstream from the equipment X acts on the mutually superposed articles 2a, 2b so as to separate them and singulate them on the conveyor 41 so as to make it possible to sort the articles 2a, 2b into the sorting outlets 42.

Naturally, the present invention is in no way limited to the above description of one of its implementations, which can undergo modifications without going beyond the ambit of the invention.

The invention claimed is:

1. A method of measuring a 3D profile of an article moving on a conveyor in a certain conveying direction, which method comprises:
    using an optical sensor to scan, by triangulation, a laser line projected onto said article in the field of view of said sensor transversely to said conveying direction,
    using said optical sensor to scan by contrast difference in grayscale, a top of said article moving on said conveyor,
    illuminating said article with white light parallel to said laser line when performing the scan of said article by contrast difference; and
    making combined use of the results of the scans by triangulation and by contrast difference in a data processor unit for the purpose of measuring the 3D profile of said article, wherein the scan by contrast difference and the scan by triangulation are formed using the same optical sensor, said optical sensor being arranged to scan, in its field of view, said laser line and a strip of contrast difference that is transverse to said conveying direction, and wherein said data processor unit is arranged to match, in time, the scan by triangulation and the scan by contrast difference, according to a speed of the conveyor in the conveying direction, in such a manner as to merge them for measuring said 3D profile.

2. A method according to claim 1, wherein the steps of using an optical sensor to scan by triangulation and by contrast difference are performed in alternation.

3. A method according to claim 1, wherein the steps of using an optical sensor to scan by triangulation and by contrast difference are performed simultaneously.

4. A method according to claim 1, further comprising a step of using said optical sensor to scan by triangulation another laser line projected onto said article that is moving.

5. A method according to claim 1, wherein said white light is produced by LEDs.

6. A method according to claim 1, wherein said white light is operated in a cross-polarized manner.

* * * * *